Aug. 9, 1949.  J. M. ZYSK  2,478,518
MICROMETER HEIGHT GAUGE
Filed Feb. 12, 1948  2 Sheets-Sheet 2
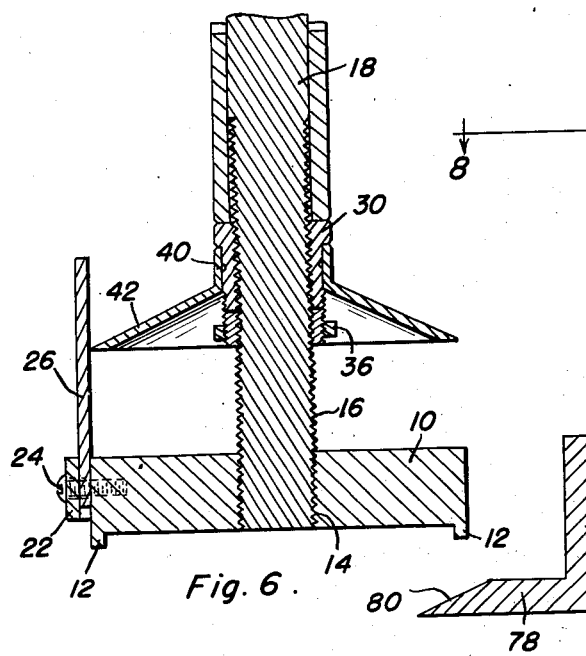
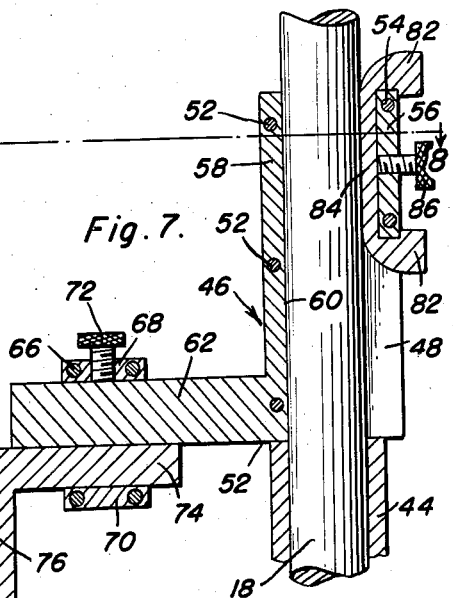
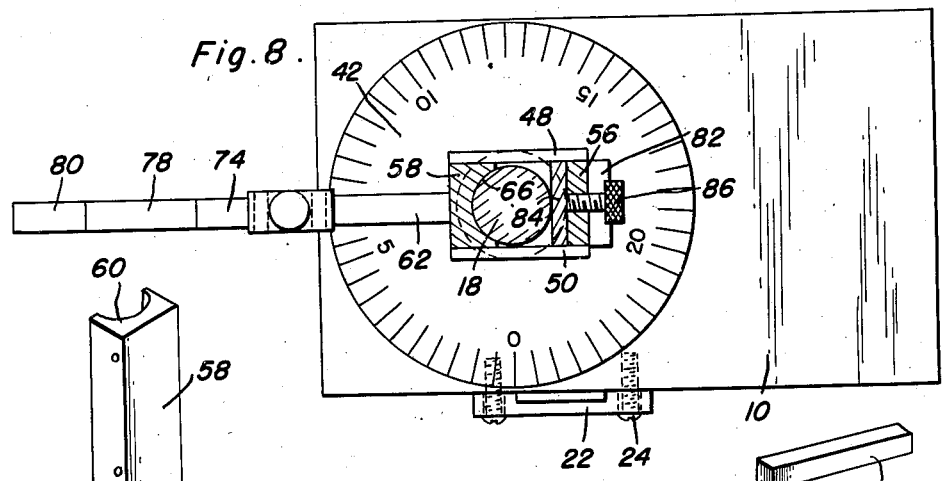
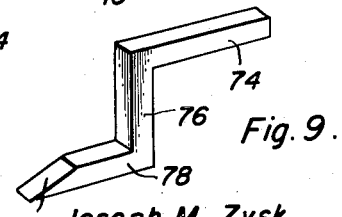
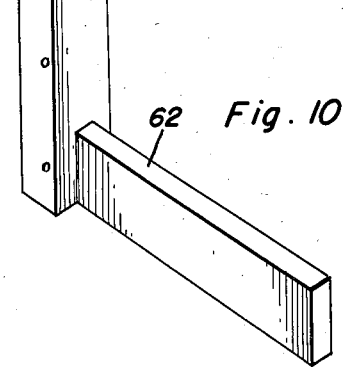
Joseph M. Zysk
INVENTOR.
BY *Clarence A. O'Brien
and Harvey B. Jacobson*
Attorneys Patented Aug. 9, 1949

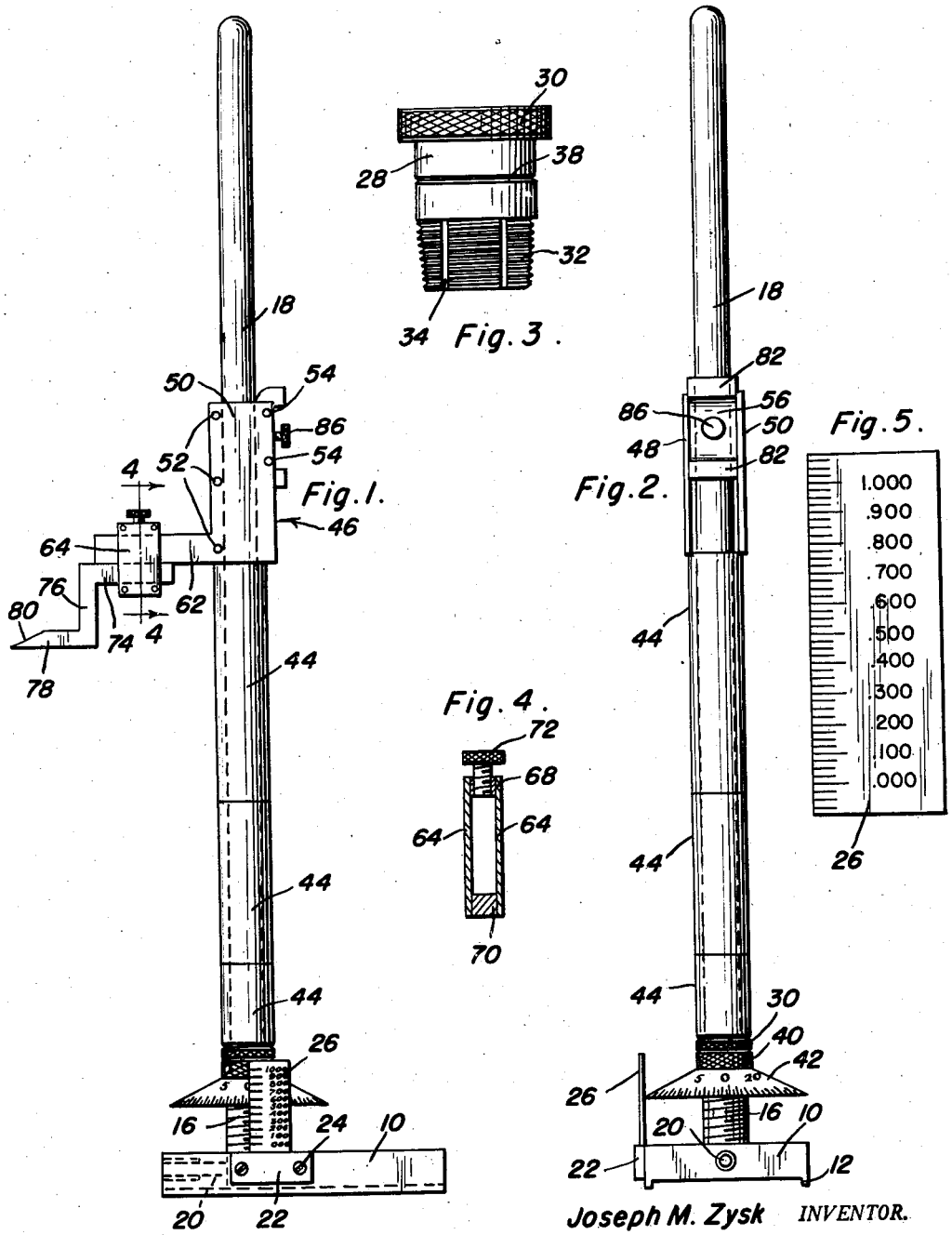

2,478,518

UNITED STATES PATENT OFFICE 2,478,518

MICROMETER HEIGHT GAUGE

Joseph M. Zysk, Detroit, Mich.

Application February 12, 1948, Serial No. 7,800

5 Claims. (Cl. 33—170)

1

This invention comprises novel and useful improvements in a height gauge and more specifically pertains to a device for measuring and scribing vertical surfaces with micrometric accuracy and with facility.

The principal object of this invention resides in the provision of an instrument for scribing lines and measuring vertical heights of articles with facility and with the accuracy of a vernier micrometer.

An important feature of the invention resides in the provision of a base having a fixed standard thereon, a scriber carriage slidable upon the standard, a novel fastening means for adjustably securing the carriage to the standard and for simultaneously providing a finger grip portion for raising or lowering the carriage; a micrometer arrangement screw threaded upon the lower end of the standard constituting a vernier micrometer for accurately and exactly measuring small distances; and a series of calibrated spacing sleeves selectively positionable upon the upper end of the micrometer gauge, for augmenting the scope of measuring of the latter.

These, together with various ancillary objects and features of the invention which will later become apparent as the following description proceeds, are attained by this device, a preferred embodiment of which has been illustrated by way of example only in the accompanying drawings, wherein:

Figure 1 is a side elevational view of a preferred embodiment of the invention;

Figure 2 is a rear view of the apparatus of Figure 1;

Figure 3 is a front elevational view of an element of the micrometer portion of the invention;

Figure 4 is a vertical transverse sectional detail view through the scriber fastening means and is taken substantially upon the plane of the section line 4—4 of Figure 1;

Figure 5 is a front elevational view of the micrometer scale forming an element of the invention;

Figure 6 is a vertical sectional detail view taken upon an enlarged scale of the base, lower portion of the standard and showing the micrometer construction thereof;

Figure 7 is an enlarged detail view taken in vertical section through the scriber carriage, the scriber fastening means and scriber, and showing certain constructional details thereof;

Figure 8 is a top plan view of the invention

2 taken substantially upon the plane of the horizontal section line 8—8 of Figure 7;

Figure 9 is a perspective view of the scriber of the invention; and

Figure 10 is a perspective view of the scriber support arm forming a part of the invention.

Referring now more specifically to the accompanying drawings, wherein like numerals designate similar parts throughout the various views, attention is directed first to Figures 1 and 2, and the enlarged detail showing of Figure 6, wherein 10 designates a support or base of the device which may be of any suitable material and shape, and is preferably provided with depending ribs or flanges 12 which comprise legs for supporting the base. The base is provided with a suitable vertically disposed threaded aperture 14 in which is screw threadedly engaged the lower end of a rod-like standard 18, the threaded lower end portion 16 of which is preferably provided with threads of a predetermined and known pitch in order to constitute measuring means for a micrometer attachment.

The standard 18 is rigidly retained in position on the base 10, by means of a set screw 20 extending through a suitable bore in the base whereby the standard is locked against accidental movement which would tend to render inaccurate the micrometer measurements obtained therefrom as set forth hereinafter.

By means of a clamping plate 22, and fastening screws 24 for attaching the same in clamping engagement to the side of the base 10, there is rigidly mounted in vertical position and in juxtaposition to the standard 18, a scale member 26 provided with finely graduated markings which may for example be forty to an inch. Preferably these markings extend over a predetermined distance of the scale, such for example as one inch, whereby a very accurate reading within this limit may be obtained.

Referring now to Figures 3 and 6 for a better understanding of the construction of the micrometer element, there is disclosed a sleeve or bushing 28 having a knurled finger grip portion 30 for adjustment of this bushing, the bushing being internally threaded for adjustment upon the screw threads 16. The lower end of this bushing comprises a collet which is externally threaded as at 32, is of tapering or frusto-conical shape upon its exterior surface, and is provided with a plurality of longitudinal slots 34 therein, for imparting resiliency or flexibility to the material thereof. A lock nut 36 is screw threaded upon the threaded portion 32 and by reason of the tapering threads, movement of this nut will result in a clamping or binding action of the collet upon the threads 16, thereby providing an adjustable frictional drag of the sleeve upon the threads. Upon its body portion, the sleeve 28 is provided with a V-shaped groove 38 within which is pressed a corresponding portion of a sleeve-like hook 40 for retaining the latter rigidly upon the bushing 28, for rotation therewith. From this hook or sleeve 40, extends a conical thimble 42 which is provided with suitable indicia upon the upper peripheral edge thereof, for registration with the gauge 26 as shown in Figure 1.

It should be here noted that as the micrometer thimble is raised or lowered, the lower edge of the thimble will constitute an indicator registering with the scale 26, to thereby give a very accurate reading of the height of the lower edge, and hence the top of the thimble or micrometer member 28, with reference to a datum plane which may be either the upper or lower surface of the base 10. Further, the registration of the indicia upon the thimble 42, which indicia preferably divide the circumference into fifty equal units, constitute a vernier means since the registration of any given indicia with the edge of the scale 26 will accurately indicate the proportion of a turn and hence will indicate a very fine measurement within the limits of the micrometer scale 26.

Preferably, the upper surface of the finger grip portion 30 is employed to support a scriber carriage for marking or measuring, this carriage slidably embracing the standard 18, and either resting directly upon the portion 30, or being spaced selected predetermined distances therefrom by the interposition of one of a series of very accurately calibrated insert sleeves 44 which may be slidably placed upon the standard 18, between the micrometer member 28 and the bottom of the scriber carriage. Thus, by properly choosing the length of the insert sleeves, the exact measurement within very fine divisions of an inch of the micrometer member is added to the gauge block sleeves 44 for imparting the same accuracy to larger measurements.

Attention is now directed more particularly to Figures 1, 2, 7 and 8 for a better understanding of the scriber carriage indicated generally by the numeral 46. This carriage consists of a pair of side plates 48 and 50 which are joined together in rigid assembly by means of clamping screws 52 in one edge, and a pair of clamping screws 54 in the other edge thereof. These latter clamping screws serve to retain a bridge member 56 comprising a flat bevelled block which is interposed between the two plates 48 and 50 at the upper ends thereof. The fastening screws 52 further serve to clamp a slide or guide 58 between the front ends of the plates 48 and 50, this slide having a semi-cylindrical concave surface 60 on the inside thereof for sliding engagement upon and conforming to the curvature of the standard 18. Integrally extending laterally from the lower portion of the slide 58, is a horizontally disposed support arm 62. Longitudinally slidable upon the arm 62 is a scriber clamp which as shown in Figure 4 consists of a pair of parallel generally rectangular plates 64 between which are secured upper and lower blocks 68 and 70 respectively. These blocks and plates may be rigidly united as by screws, rivets or the like. Screw threaded through the upper block 68, is a thumb screw 72 for clamping the device in adjusted position upon the arm 62. The scriber itself is secured within the clamping device and against the under surface of the arm 62 as shown in Figure 1. This scriber as shown in Figure 9, includes a horizontal generally rectangular cross section arm 74, having a perpendicular terminally depending portion 76, which at its lower end extends into a forwardly extending extremity 78, whose end is bevelled as at 80 to provide a scriber point for marking or gauging articles with which the instrument is to be used. As shown best in Figure 7, the scriber carriage fastening means preferably consists of a U-shaped member having legs 82 extending laterally therefrom in parallel arrangement, with a central or bight portion 84. The spacing of these legs is such as to just receive the bridge 56 therebetween, whereby the bight portion 84 slidingly engages the diametrically opposite cylindrical surface of the standard 18 from that engaged by the slide surface 60. A thumb screw 86 is threaded through the bridge member 56, and presses against the inner surface of the bight portion 84 for urging the latter into frictional and clamping engagement with the standard 18. As will readily be seen, the laterally extending legs 82 not only constitute finger grip means, whereby when the screw member 86 is released, the U-shaped member, and the scriber carriage attached thereto may be easily raised or lowered, but also retain the member 84 upon member 56.

From the foregoing, it is thought that the construction and operation of the device will be readily understood. Obviously, the dimensions of the scriber, and the supporting structure thereof, may be such that the scriber point 80 whether employed as an indicator or as a marker may be adjusted with accurateness to a predetermined distance from the reference plate, whether the upper or lower surface of the base 10.

It will thus be seen that there has been provided a device which with ease and accuracy will facilitate the gauging or scribing of vertical dimensions of articles.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A height gauge comprising a base, a standard secured to said base, a carriage slidable on said standard, a clamp for adjustably securing said carriage on said standard, a scriber, means for mounting said scriber on said carriage, a micrometer sleeve on said standard and a plurality of spacing sleeves surrounding said standard interposed between said micrometer sleeve and said carriage.

2. The combination of claim 1 including screw threads on said standard adjacent said base, said micrometer sleeve being adjustable on said threads, and a scale registering with said micrometer sleeve mounted on said base.

3. The combination of claim 2 including vernier indicia on the rim of said micrometer sleeve.

4. The combination of claim 1 including screw threads on said standard adjacent said base, said micrometer sleeve being adjustable on said threads, said micrometer sleeve including an internally and externally threaded collet, a thimble on said collet, vernier indicia on the periphery of said thimble, a scale carried by said base for registry with said thimble and said vernier indicia.

5. The combination of claim 1, wherein said clamp includes a slide supported by said carriage and slidably engaging said standard, adjusting means on said carriage for pressing said slide against said standard, said slide having laterally extending legs at its extremities comprising finger-grip portions for raising and lowering said carriage on said standard.

JOSEPH M. ZYSK.

REFERENCES CITED

The following references are of record in the file of this patent:

UNITED STATES PATENTS

| Number | Name | Date |
| --- | --- | --- |
| 510,688 | Lavigne | Dec. 12, 1893 |
| 596,346 | Wallgren | Dec. 28, 1897 |
| 924,668 | Jaques | June 15, 1909 |
| 1,230,627 | Thompson | June 19, 1917 |
| 1,414,183 | Cross | Apr. 25, 1922 |